US007673776B2

(12) United States Patent
May

(10) Patent No.: US 7,673,776 B2

(45) Date of Patent: Mar. 9, 2010

(54) CARRIER ASSEMBLY FOR PERCUSSION INSTRUMENTS

(76) Inventor: Randall L May, 2 Trafalgar, Newport Beach, CA (US) 92660

( * ) Notice: Subject to any disclaimer, the term of this patent is extended or adjusted under 35 U.S.C. 154(b) by 683 days.

(21) Appl. No.: 10/950,130

(22) Filed: Sep. 27, 2004

(65) Prior Publication Data

US 2005/0040193 A1 Feb. 24, 2005

Related U.S. Application Data

(60) Continuation-in-part of application No. 10/831,638, filed on Apr. 23, 2004, now Pat. No. 6,881,886, which is a continuation-in-part of application No. 10/374,676, filed on Feb. 26, 2003, now Pat. No. 7,071,401, which is a continuation-in-part of application No. 10/170,005, filed on Jun. 10, 2002, now Pat. No. 6,770,805, which is a division of application No. 09/756,479, filed on Jan. 8, 2001, now Pat. No. 6,403,869, which is a continuation-in-part of application No. 09/507,800, filed on Feb. 22, 2000, now Pat. No. 6,172,290, which is a division of application No. 09/497,265, filed on Feb. 3, 2000, now Pat. No. 6,323,407.

(51) Int. Cl.

| | |
|---|---|
| *A45F 3/10* | (2006.01) |
| *G10D 13/02* | (2006.01) |
| *B32B 19/04* | (2006.01) |

(52) U.S. Cl. ......................... 224/266; 224/265; 84/421; 248/443

(58) Field of Classification Search ................. 224/266, 224/265, 910, 201; 84/421; 248/443
See application file for complete search history.

(56) References Cited

U.S. PATENT DOCUMENTS

| | | | | |
|---|---|---|---|---|
| 1,179,063 | A * | 4/1916 | Aldrete | 359/879 |
| 1,191,425 | A * | 7/1916 | Huddle | 108/43 |
| 1,296,619 | A * | 3/1919 | Bulat | 224/160 |
| 4,256,007 | A | 3/1981 | Streit | |
| 4,387,839 | A * | 6/1983 | Dranchak | 224/265 |
| 4,402,441 | A | 9/1983 | Jones et al. | |
| 4,453,442 | A | 6/1984 | LaFlame | |
| 4,453,446 | A | 6/1984 | Hoshino | |
| 4,605,144 | A | 8/1986 | LaFlame | |
| 4,634,032 | A | 1/1987 | LaFlame | |
| 4,715,293 | A * | 12/1987 | Cobbs | 108/43 |

(Continued)

OTHER PUBLICATIONS

U.S. Appl. No. 10/374,676, filed Nov. 2003, May.

(Continued)

*Primary Examiner*—Nathan J Newhouse
*Assistant Examiner*—Lester L Vanterpool
(74) *Attorney, Agent, or Firm*—Kirk A. Buhler; Buhler & Associates

(57) ABSTRACT

Drum hardware and drum secured thereon are preferably supported on a vest type carrier or a T-bar carrier having a plurality of separate parts removable from each other and formed of a rigid plastic, light metal such as magnesium, aluminum or titanium. The removable hardware includes a removable back support member. The instrument carrier includes an articulating hinge that allows for positive, negative or neutral horizontal positioning of the instruments. The articulating hinge assembly further allows the carrier to be folded for easier transportation and storage in a smaller area.

7 Claims, 9 Drawing Sheets

U.S. PATENT DOCUMENTS

| | | | | | |
|---|---|---|---|---|---|
| 4,796,508 | A | | 1/1989 | Hoshino | |
| 4,799,610 | A | * | 1/1989 | Hsieh | 224/266 |
| 5,220,704 | A | * | 6/1993 | Flynn et al. | 15/321 |
| 5,400,683 | A | * | 3/1995 | LaFlame | 84/421 |
| 5,464,137 | A | * | 11/1995 | Shirdavani | 224/265 |
| 5,520,292 | A | | 5/1996 | Lombardi | |
| 5,524,462 | A | * | 6/1996 | Loughlin | 70/20 |
| 5,573,158 | A | * | 11/1996 | Penn | 224/265 |
| D388,246 | S | * | 12/1997 | Patterson | D3/204 |
| 5,806,734 | A | * | 9/1998 | Scott | 224/265 |
| 5,973,247 | A | * | 10/1999 | Matthews | 84/402 |
| 6,028,257 | A | | 2/2000 | May | |
| 6,172,290 | B1 | | 1/2001 | May | |
| 6,323,407 | B1 | | 11/2001 | May | |
| 6,329,583 | B1 | | 12/2001 | May | |
| 6,409,517 | B2 | * | 6/2002 | Malnati | 439/38 |
| 7,071,401 | B2 | * | 7/2006 | May | 84/421 |

OTHER PUBLICATIONS

U.S. Appl. No. 10/170,005, filed Jan. 2003, May.

U.S. Appl. No. 09/756,479, filed Dec. 2001, May.

* cited by examiner

CARRIER ASSEMBLY FOR PERCUSSION INSTRUMENTS

CROSS REFERENCE TO RELATED APPLICATION

This application is a continuation-in-part of applicant's applications U.S. application Ser. No. 10/831,638 filed Apr. 23, 2004, now U.S. Pat. No. 6,881 ,886, issued Apr. 19, 2005 which claims the benefit of Continuation-in-part U.S. application Ser. No. 10/374,676 filed Feb. 26, 2003 now U.S. Pat. No. 7,071,401, issued Jul. 4, 2006 ,which claims the benefit of Continuation-in-part of application Ser. No. 10/170,005 filed Jun. 10, 2002, now U.S. Pat. No. 6,770,805, issued Aug. 3, 2004, which claims the benefit of Divisional application U.S. Ser. No. 09/756,479 filed Jan. 8, 2001, now U.S. Pat. No. 6,403,869, issued Jul. 11, 2002, which claims the benefit of Continuation-in-part application U.S. Ser. No. 09/507,800 filed Feb. 22, 2000, now U.S. Pat. No. 6,172,290, issued Jan. 9, 2001, which claims the benefit of Divisional application U.S. Ser. No. 09/497,265 filed Feb 3, 2000, now U.S. Pat. No. 6,323,407, issued Nov. 27, 2001.

In a concise format the referenced applications are

This application is a Continuation in part of U.S. application. Ser. No. 10/831,638 filed Apr. 23, 2004, now U.S. Pat. No. 6,881,886 is a Continuation-in-part of U.S. application. Ser. No. 10/374, 676 filed Feb. 26, 2003, now U.S. Pat. No. 7,071,401 is a Continuation-in-part of U.S. application. Ser. No. 10/170, 005 filed Jun. 10, 2002, now U.S. Pat. No. 6,770,805 is a Division of U.S. application. Ser. No. 09/756,479 filed Jan. 8, 2001, now U.S. Pat. No. 6,403,869 is a Continuation-in-part of U.S. application Ser. No. 09/507, 800 filed Feb. 22, 2000, now U.S. Pat. No. 6,172,290 is a Division of U.S. application Ser. No. 09/497,265 filed Feb. 3, 2000, now U.S. Pat. No. 6,323,407

FIELD OF THE INVENTION

This invention relates to new and useful improvements in apparatus for carrying percussion instruments, particularly drums of various kinds, cymbals, xylophones, and the like. More particularly, the present invention relates to a carrier hardware providing a novel articulating hinge assembly for the support for percussion instruments and to carrier assemblies supporting percussion instruments on a person while standing, walking or marching. The carrier assembly has a construction and relationship of parts to transfer the weight of the percussion instrument(s) to the body of a person. A clamp is located in the front of the carrier. The clamp allows the carrier to be folded for easier transportation and storage in a smaller space. The clamp can be loose to allow the linked parts to move freely, or the clamp can be locked to fix the linked parts in position. The person carrying the instruments maintains a stable attitude while walking or marching about and avoids pressure or other forms of detrimental forces on the shoulders and lower back and is further characterized by having removable and/or adjustable back support member or members. The adjustment to the back support member position may also be accomplished using a fixed back support member with adjustable shoulder straps. The back member may be secured to the shoulder straps and the shoulder straps may be removable and or adjustable to accommodate different sized users.

BACKGROUND OF THE INVENTION

The prior art discloses many examples of apparatus for supporting percussion instruments but none providing the combination of features disclosed and claimed herein.

La Flame U.S. Pat. No. 5,400,683 discloses a carrier for percussion instruments having an abdominal plate connected at one end of a unitary frame partly encircling the wearer at the waist and having an upstanding rear portion pivotally connected to a back pressure plate. Shoulder bars are connected to the back pressure plate, and wrap about shoulders and support straps connect to the abdominal plate, which has suitable fixtures for attachment of various percussion instruments. This invention uses a fixed chest plate that does not hinge to allow free movement, or folding of the vest. The absence of the hinge clamp prevents the carrier from being folded for easier storage.

La Flame GB patent 2,123,676 (based on U.S. Pat. No. 4,453,442) discloses a carrier for percussion instruments or the like which includes the combination of a belly plate with a carrier bracket for supporting an instrument at an outwardly-overhung position about a fulcrum area of contact with the front waistline area of the person. The patent includes a rigid band with a generally bent contour to extend along a portion of the waistline area of the person to the back of the person. The patent includes a back-plate riser arm supported by the ban to extend in a generally upward direction such that a portion of the arm will extend along the back thoracic region of the person, and means carried by the arm for imparting to the thoracic back region of the person. The arm causes a reactive force to the overhung weight of the instrument about the aforesaid means forming a fulcrum area of contact with the person. This invention uses a fixed chest plate that does not hinge to allow free movement, or folding of the vest. The absence of the hinge clamp prevents the carrier from being folded for easier storage.

May U.S. Pat. No. 5,691,492 discloses hardware for supporting drums that is of a hinged construction and has one part of the hinge connectable to an external support, e.g., J-rods on a fixed support or a marching drum carrier. Another part of the hinge is connectable to the shell of a drum or to the tension rods on a drum or to other hardware on the drum. This invention allows for a hinge where the instruments are connected to the supporting structure, but the hinge is not located in the chest area of the user. The location of the hinge in this patent is intended for movement of the percussion instrument, and is not for the purpose of folding of movement in the area above where the instrument is attached.

May U.S. Pat. No. 6,323,407 discloses hardware for a shoulder supported carrier for percussion instruments with a hinge located in the chest area. This invention allows for a hinge in the chest support region, but it does not, allow for the hinge to be clamped to lock the orientation of the upper and lower portions of the carrier.

May U.S. Pat. No. 6,028,257 shows drum hardware and drums secured thereon preferably supported on a vest type carrier or a T-bar carrier or a fixed post or pedestal.

May U.S. Pat. No. 6,172,290 shows a hinged support for an array of drums.

May U.S. Pat. No. 6,329,583 discloses hardware and drums secured thereon preferably supported on a vest type carrier or a T-bar carrier with adjustable vest components.

May U.S. Pat. No. 6,403,869 discloses hardware and drums secured thereon preferably supported on a vest type carrier or a T-bar carrier with adjustable vest components.

The prior art discloses many examples of apparatus for supporting percussion instruments but none provide the combination of features that allow for a lockable hinge clamp that allows the carrier to both articulate, fold and lock into position. The prior art does not disclose an assembly that can be folded to allow for easier transportation and storage. The combination of features will be disclosed and clamed herein.

BRIEF SUMMARY OF THE INVENTION

One of the objects of this invention is to provide a new and improved instrument carrier with a hinged clamp located in the front of the instrument carrier.

Another object of the invention is providing an pivoting hinge mechanism that can be adjusted from free movement to a locked orientation.

Another object of the invention is to provide an instrument carrier that can be folded to allow for easier transportation, carrying and storage.

Another object of the invention is to provide changeable padding on the back support to allow for a variety of cushioning heights.

One object of the invention is to provide a new and improved carrier for percussion instruments, e.g., a snare drum, having hardware with a removable back bar, back plate, back member, back members, back support member or back pressure plate.

Another object of the invention is to provide a new and improved carrier for percussion instruments comprising a back support member with adjustable width.

Another object of the invention is to provide adjustment to the back support member where the back support member is attached to adjustable shoulder straps wherein adjustment to the shoulder straps, moves the back support member.

Another object of the invention is to provide an adjustable frictional pivoting mechanism to link the shoulder straps with the back member.

Another object of the invention is to provide a foldable carrier where the upper portion is an integral part of the shoulder straps.

Another object of the invention is to provide a new and improved carrier for percussion instruments comprising a novel supporting vest of composite material (Fiberglass), rigid removable shoulder straps of light metal, and back member of light metal such as aluminum, magnesium, etc.

Another object of the invention is to provide a back member that is secured to shoulder straps that are removable and or adjustable to accommodate different sized users. The securing method may be rigidly secured or secured with fasteners that allow the back member to pivot on the shoulder straps. The secured back member may be adjustable for width.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figures 1, 2:
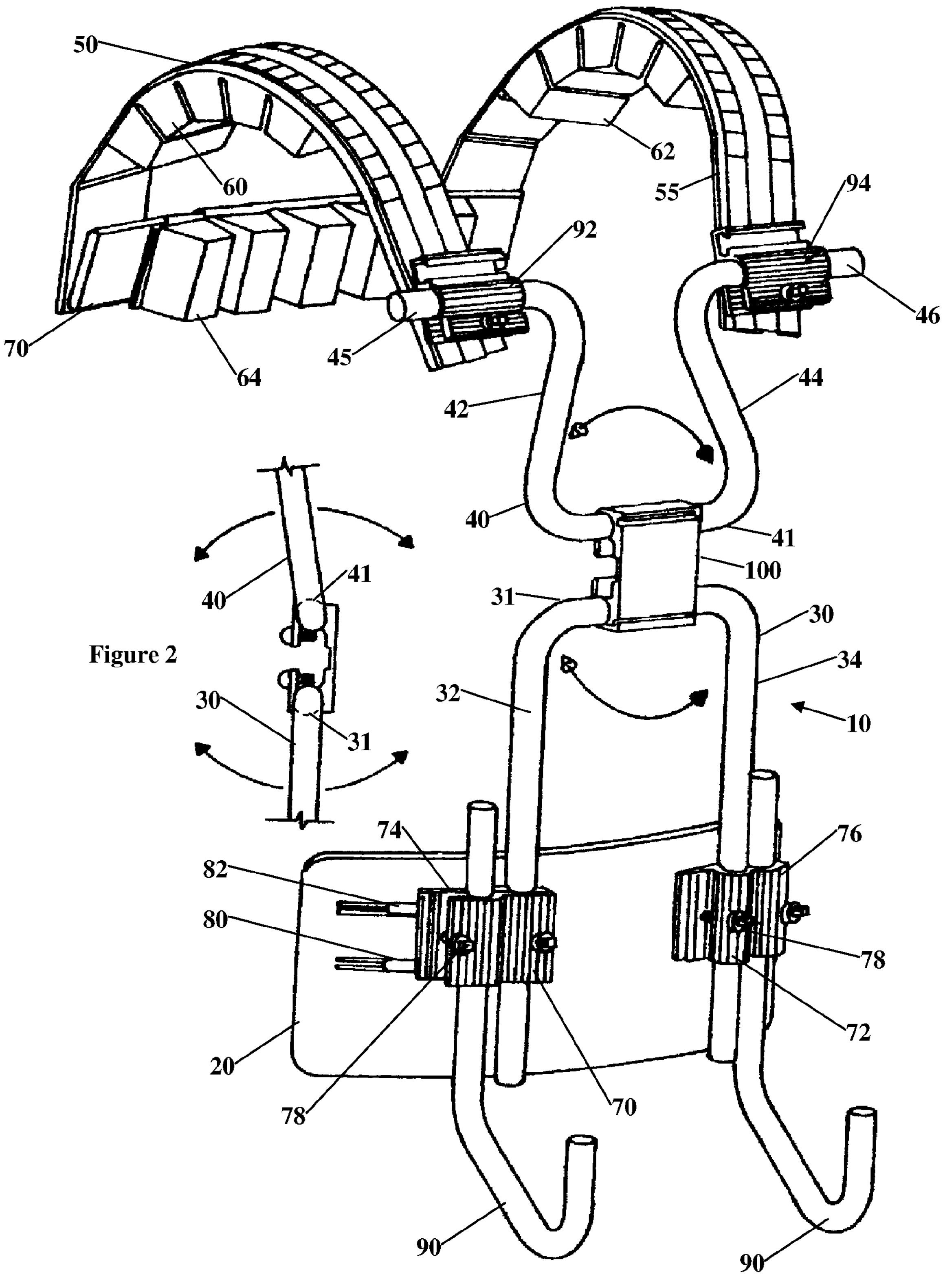
FIG. 1 is an isometric view of a tubular construction T-bar type carrier for a marching drum assembly with an articulating hinge assembly.
FIG. 2 is a side view of the articulated joint in the hardware shown in FIG. 1

Referring to FIG. 1, there is shown a tubular T-bar-type carrier 10 for percussion instruments that comprises a belly plate 20, lower and upper vertical supporting rods or tubes 30 and 40. Lower rod or tube 30 is U-shaped lower component with parallel portions 32 and 34 supporting belly plate 20. Upper rod or tube 40 is U-shaped chest component with legs 42 and 44 having out-turned portions 45 and 46 connected to shoulder supporting rigid shoulder straps 50 and 55 and back bar 70. Back bar 70 may be removably secured to shoulder straps 50 and 55 or may be fixed as by welding or the like. Shoulder straps 50, 55, and back bar 70 have cushions 60, 62 and 64, respectively. The cushions are of a type used to pad the interior of football and other sports helmets and are shown in more detail in co-issued Pat. No. 6,028,257. The cushions have a backing strip of polyvinyl plastic film. A thin sheet of polyvinyl film encloses blocks of closed pore plastic (e.g., polystyrene or polyurethane) foam and is sealed to the backing strip to enclose separate blocks which are separately compressible and provide more comfort to the wearer of the carrier when fully loaded. Belly plate 20 is removably secured on the lower ends 32 and 34 of vertical rod or tube 30 by clamping receptacles 70 and 72. J-rod receptacles 74 and 76 are secured on belly plate 20 in slots 82 and 80 by screws, bolts, or the like. J-rods 90 are secured in receptacles 74 and 76 by bolts 78. The upper, out-turned ends 45 and 46 of supporting rod or tube 40 are supported in clamping receptacles 92 and 94 on shoulder straps 50 and 55. An intermediary joiner or clamp component 100 holds and is pivotably linked through rods or tubes 31 and 41 in an articulated relation to permit angular flexing as shown in FIG. 2 to create three independent hinged components of the chest component 40, intermediary joiner of clamp component 100 and the lower component 30.

The materials of construction used in this carrier 10 are very important for achieving the desired result. The belly plate 20, supporting rods or tubes 30 and 40, shoulder straps 50 and 55 and back bar 70 are rigid and made of a light metal such as aluminum, magnesium or titanium. The metal shoulder straps have the advantage that different sizes are readily accommodated.

Operation

The operation of this carrier should be apparent but will be described briefly for clarity. The carrier 10 is worn by the musician with the shoulder straps 50 and 55 positioned over the shoulders and the belly plate 20 supported against the abdomen. J-rods 90 are inserted in position and secured in place by tightening bolts 78. The short outer ends of the J-rods 90 are inserted into the J-rod receptacles on the percussion instrument being carried, e.g., drums (single or array), cymbals, xylophone, marimba, or the like.

The carrier is adjustable to the comfort of the wearer and also to fit different sized instruments. Clamp-receptacles 92 and 94 permit pivotal, lateral and angular adjustment of shoulder straps 50 and 55 on the out-turned ends 45 and 46 of rod or tube 40. Clamp-receptacles 70 and 72 permit vertical sliding adjustment of rod or tube 30. Slots 82 and 80 in belly plate 20 allow lateral adjustment of clamp-receptacles 74 and 76 and angular adjustment of J-rods 90 supported therein.

Figure 3:
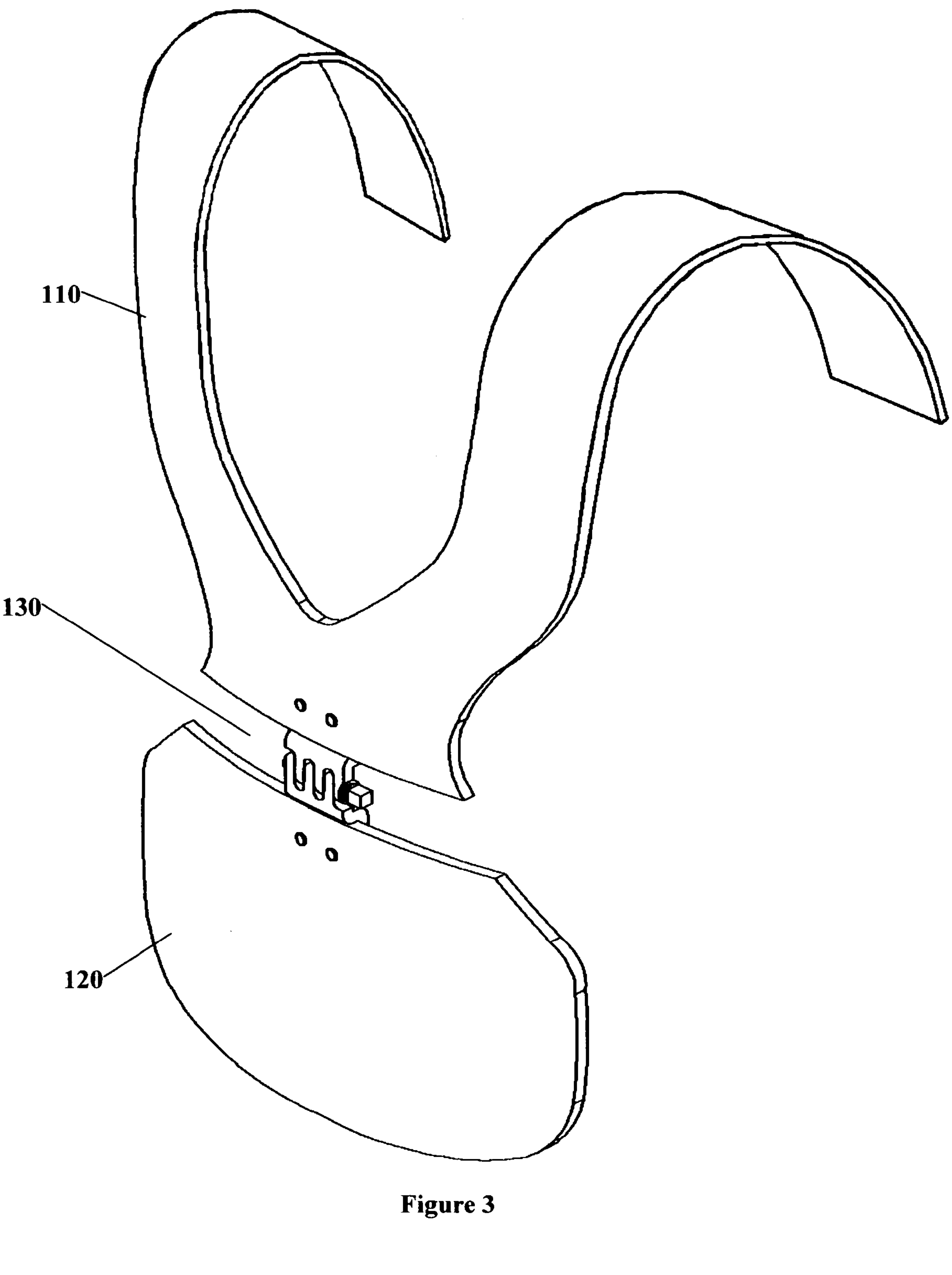
FIG. 3 is an isometric view of a hinged vest with integrated shoulder straps and a single hinge.
Figure 4:
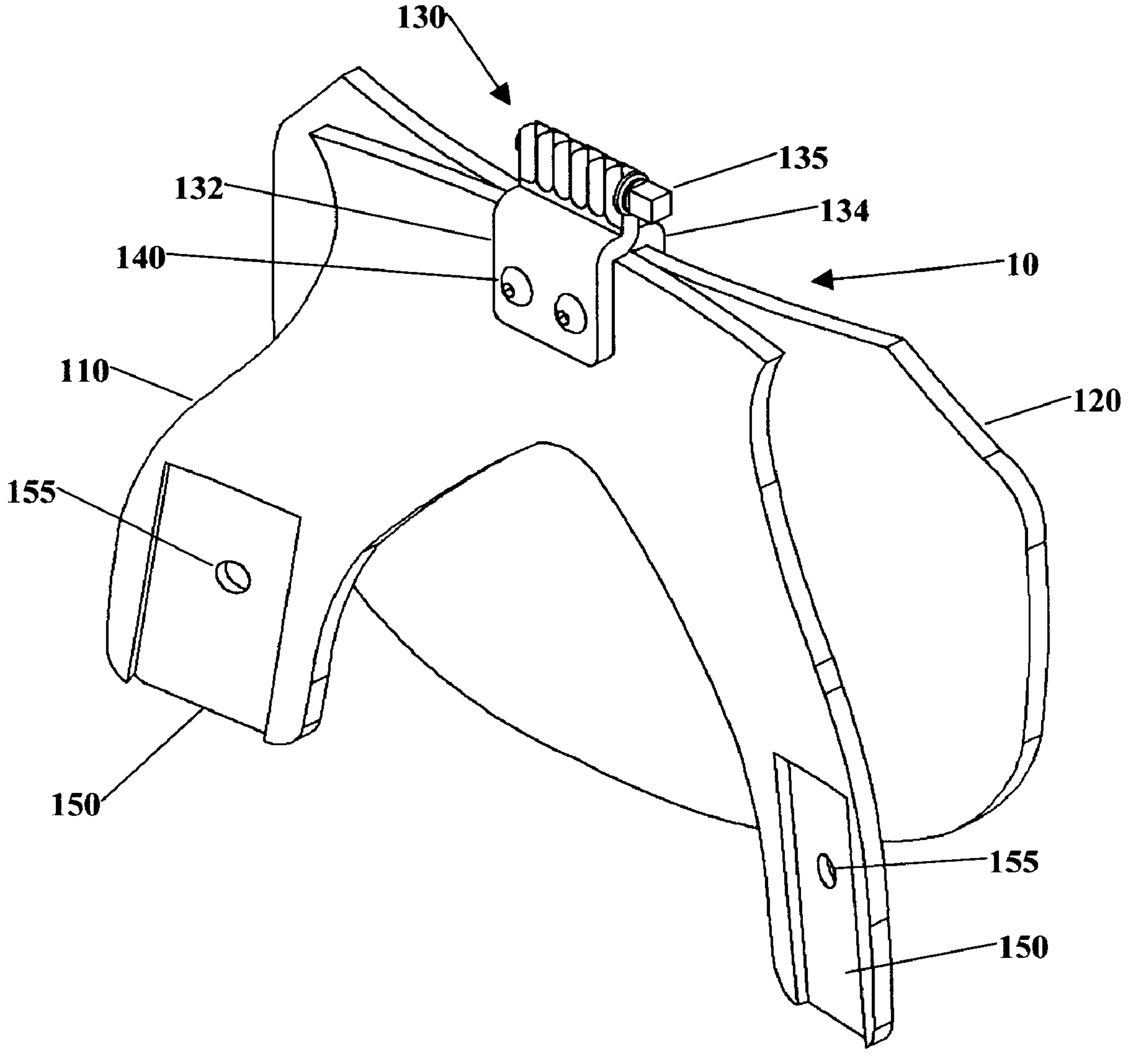
FIG. 4 is an isometric view of the vest in FIG. 3 folded without shoulder straps.

Referring to FIGS. 3 and 4, there is shown a vest type carrier comprising a chest plate 110 and a belly plate area 120, and a hinge structure 130. In FIG. 3 the vest is shown as a monolithic construction where the shoulder straps are part of the carrier. The shoulder straps are integrated into the upper part of the carrier, but can be integrated as removable shoulder straps where the shoulder straps are integrated into the carrier with hardware such as screws, bolts. In FIG. 4, just the vest and hinge components are shown. A variety of shoulder strap and linkage configurations can be added to the chest plate. The shoulder straps can be added to the recessed areas 150, and connected using a fastener using holes 155. While this and other figures show a recess for the shoulder connection, the connection of the shoulder straps can be flat with the vest or elevated from the vest. FIG. 4 shows the vest in a folded configuration. In this configuration, the overall height of the vest in reduced to allow the vest to be transported and stored in a smaller area. The hinge mechanism in this figure is has an upper portion 132 connected to the chest plate portion. The hinge mechanism has a lower portion 134 connected to the lower portion of the vest. The hinge components are attached to the vest portions using a variety of fasteners 140 including screws, rivets, glue, welding, and interference type fasteners. Any type fastener can be used that can retain the hinge to the vest. The upper and lower hinges are connected using a multi-leaved hinge. The halves are attached with fastener 135. In this embodiment, the fastener threads into the hinge. The square end of the fastener can be adjusted by turning the end of the square head. As the fastener is tightened, the multi-leaves are squeezed together and the hinge tightens. The hinge can be adjusted from loose so the upper and belly plate portions move freely, to tight, where the upper and belly plate portions are rigidly locked in position.

Figure 5:
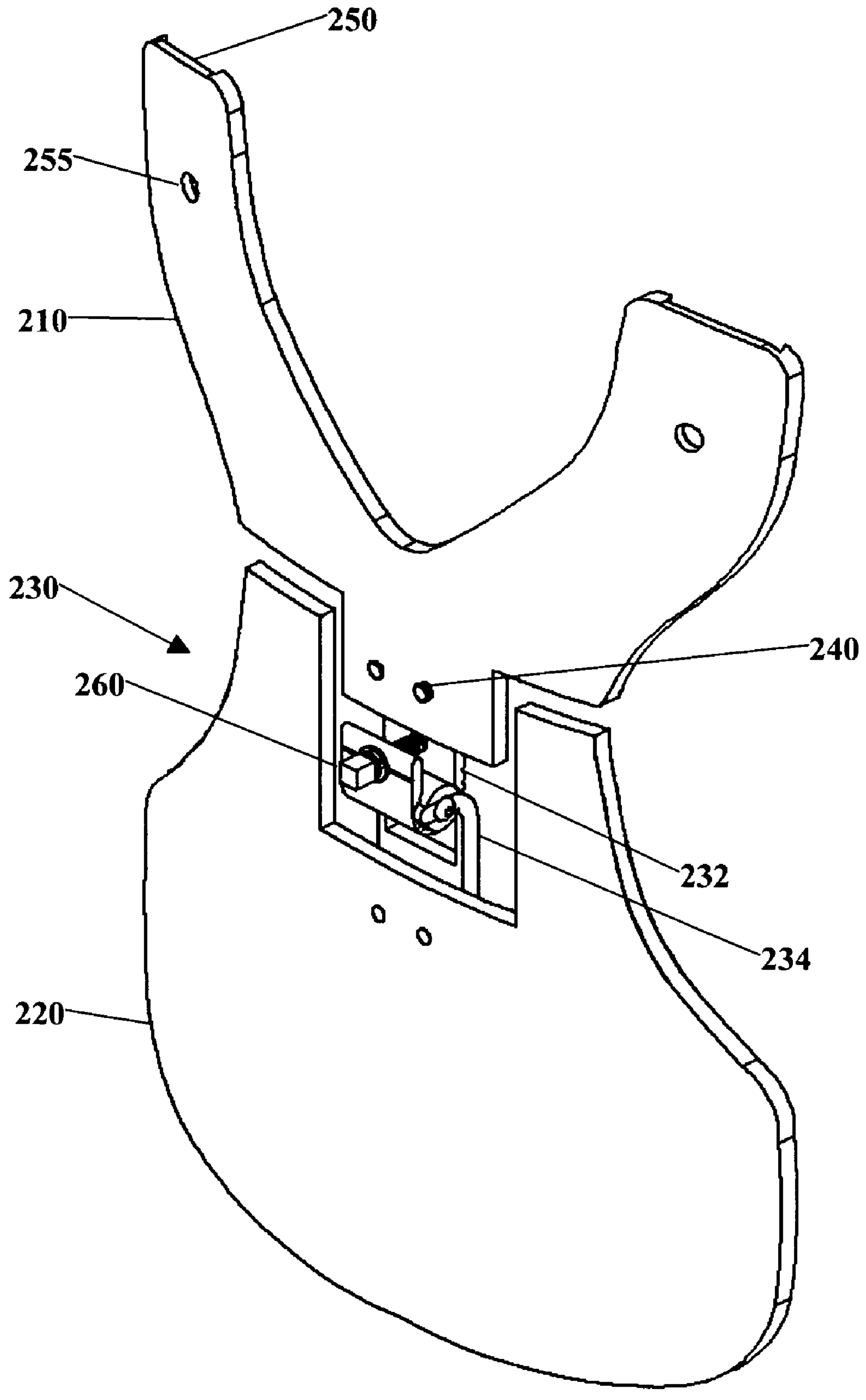
FIG. 5 is an isometric view of a vest with a hinge that can be frictionally locked or adjusted in various positions.
Figure 6:
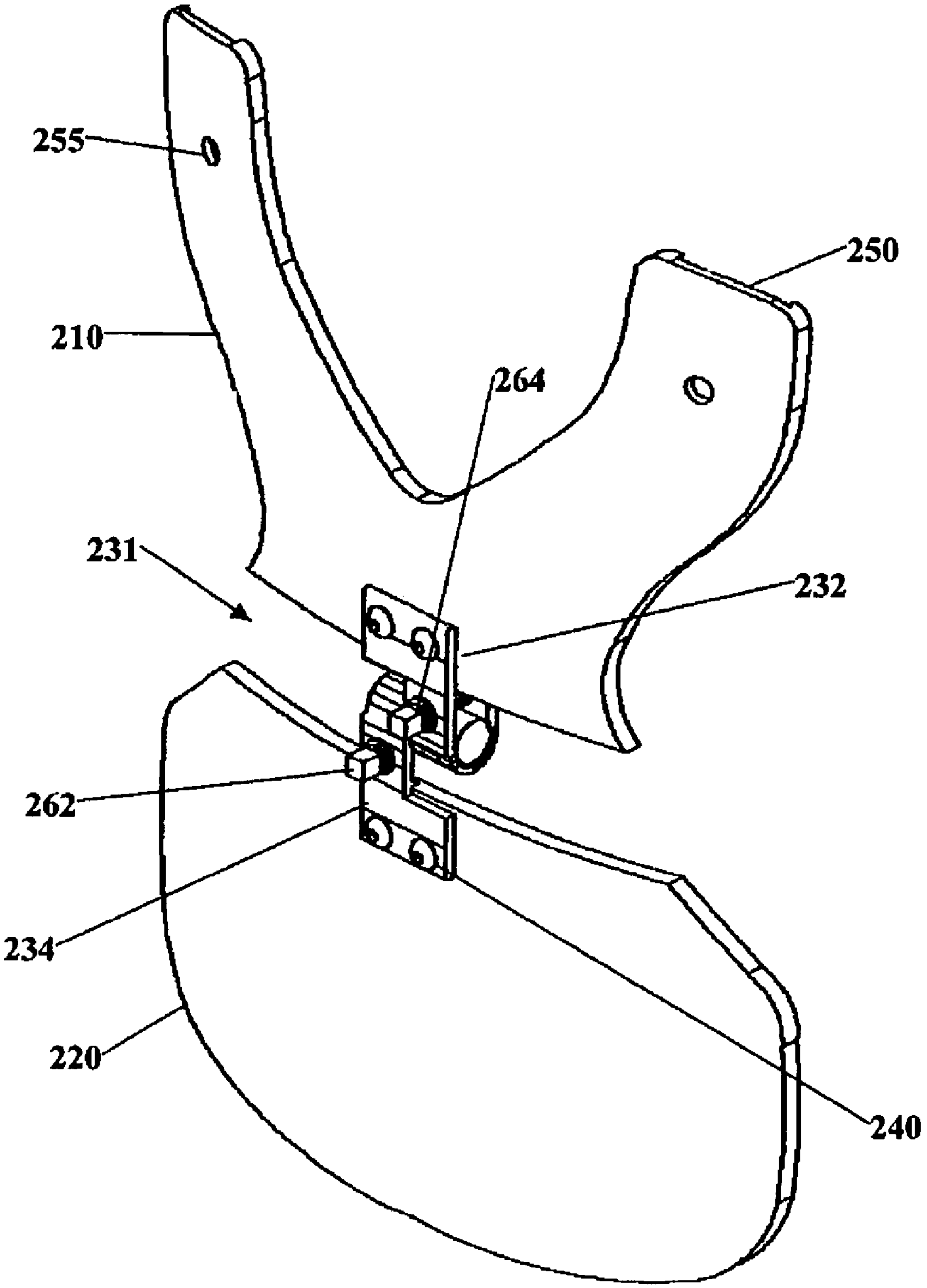
FIG. 6 is an isometric view of a vest with an alternate frictional hinge mechanism.

Referring to FIGS. 5 and 6 there is shown two vest type carriers, these vest type carriers comprises a chest plate 210 and a belly plate area 220, and a hinge structure 230 and 231. FIG. 5 shows that a portion of the belly plate or lower member 220 extends up into a section of the chest plate or upper member 230 to indicate that the lower member may not entirely exist below the upper member. In these figure just the vest and hinge components are shown. A variety of shoulder straps and shoulder strap connection fasteners can be added to the chest plate. The shoulder straps can be added to the recessed areas 250, and connected using a fastener using holes 255. The hinge mechanism in FIG. 5 shows a single clamping bolt 260. The hinge mechanism in FIG. 6 shows two clamping bolts 262 and 264. The hinge allows the upper and lower portions to be folded and create a smaller size that can be stored in a smaller are or carried more easily. The hinge in both these figures has an upper and lower portion. In FIG. 5, the hinge is attached on the side of the vest that makes contact with the front of the user. In FIG. 6, the hinge is attached on the side of the vest that is away from the user. The hinge mechanisms have an upper portion 232 that is connected to the upper portion of the vest. The hinge mechanisms have a lower portion 234 connected to the lower portion of the vest. The hinge components are attached to the vest portions using a variety of fasteners 240 including screws, rivets, glue, welding, and interference type fasteners. Any type fastener can be used that can retain the hinge to the vest. In FIG. 5, the hinge has a single pin that is tightened with clamping bolt 260. In FIG. 6 two clamping bolts, 262 and 264 are used. In this configuration, one or both adjusting bolt can be tightened or loosened independently. One or both bolts can be loosened such that the two halves can be separated. As the fastener is tightened, the hinge is squeezed together and the hinge tightens. The hinge can be adjusted from loose so the upper and belly plate portions move freely, to tight, where the upper and belly plate portions are rigidly locked in position.

Figure 7:
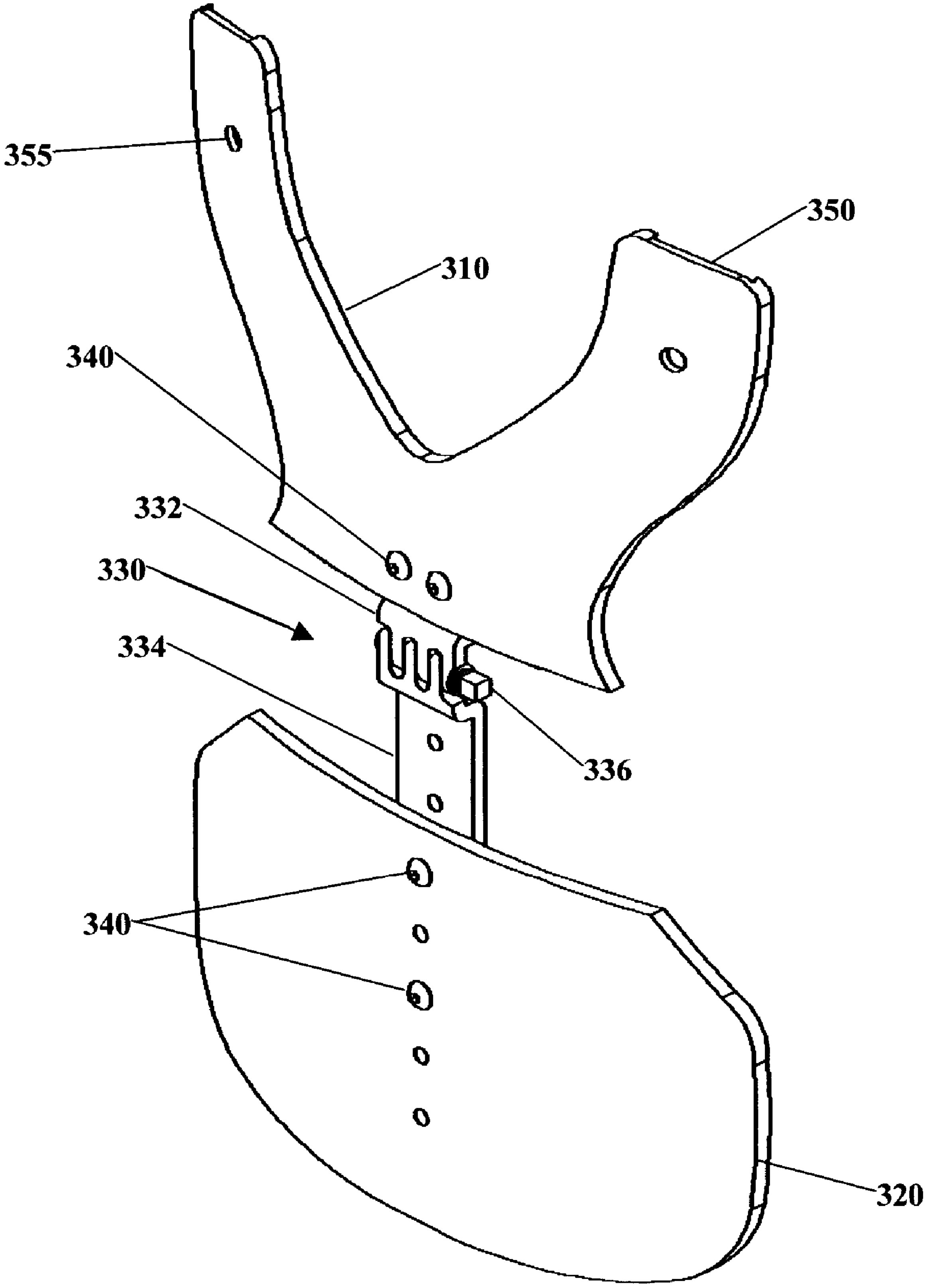
FIG. 7 is an isometric view of a vest with a hinge mechanism and adjustable height belly plate.
Figure 8:
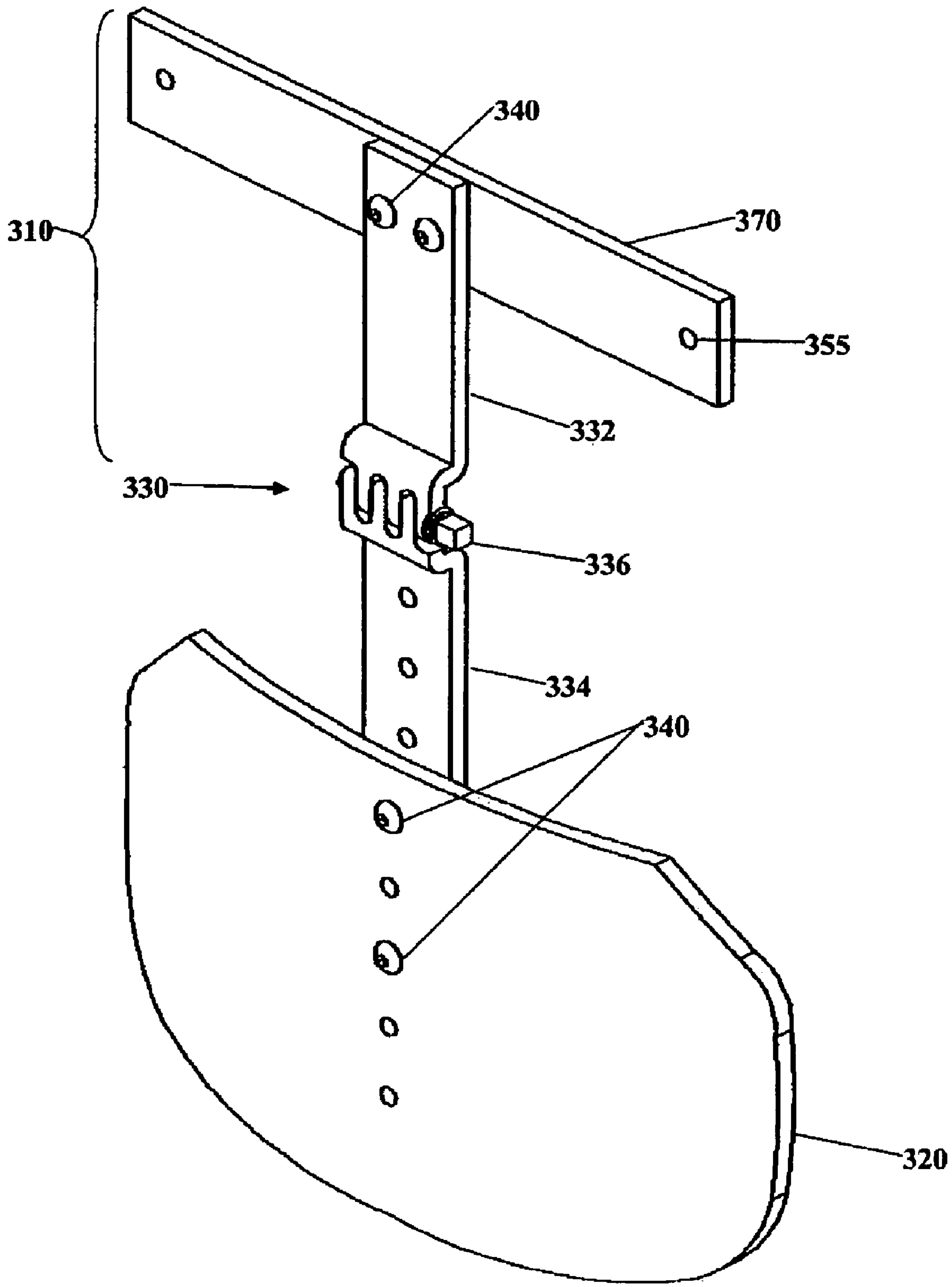
FIG. 8 is an isometric view of a T-bar assembly vest with a single hinge and adjustable height belly plate.

Referring to FIG. 7 is a vest type carrier with adjustable height and FIG. 8, is a T-bar type carrier with adjustable height belly plate comprising an chest plate 310 and a belly plate area or belly plate 320, and a hinge structure 330. In these figures, just the vest and hinge components are shown. A variety of shoulder strap and linkage configurations can be added to the chest plate. The shoulder straps can be added to the recessed areas 350, and connected using a fastener using holes 355. The hinge allows the upper and lower portions to be folded and create a smaller size that can be stored in a smaller are or carried more easily. The hinge mechanism in these figures has an upper portion 332 connected to the chest plate or T-Bar portion. The hinge mechanism has a lower or belly plate portion 334 connected to the lower portion of the vest. The hinge components are attached to the vest portions using a variety of fasteners 340 including screws, rivets, glue, welding, and interference type fasteners. Multiple holes are shown located in the lower connecting component 334. The multiple holes allow the user different height positions to locate the carrier for comfort of the user. Any type fastener can be used that can retain the hinge to the vest. The upper and lower hinges are connected using a multi-leaved hinge. The halves are attached with fastener 336. In this embodiment, the fastener threads into the hinge. The square end of the fastener can be adjusted by turning the end of the square head. As the fastener is tightened, the multi-leaves are squeezed together and the hinge tightens. The hinge can be adjusted from loose so the upper and belly plate portions move freely, to tight, where the upper and belly plate portions are rigidly locked in position. The height of the arrangement of components can be adjusted by removing the fasteners 340, moving the lower member 334 into another position and then re-inserting the fasteners 340 in the new position. The horizontal member 370 of the T-bar is perpendicularly attached to the upper hinge member 332 using fastener 340.

Figure 9:
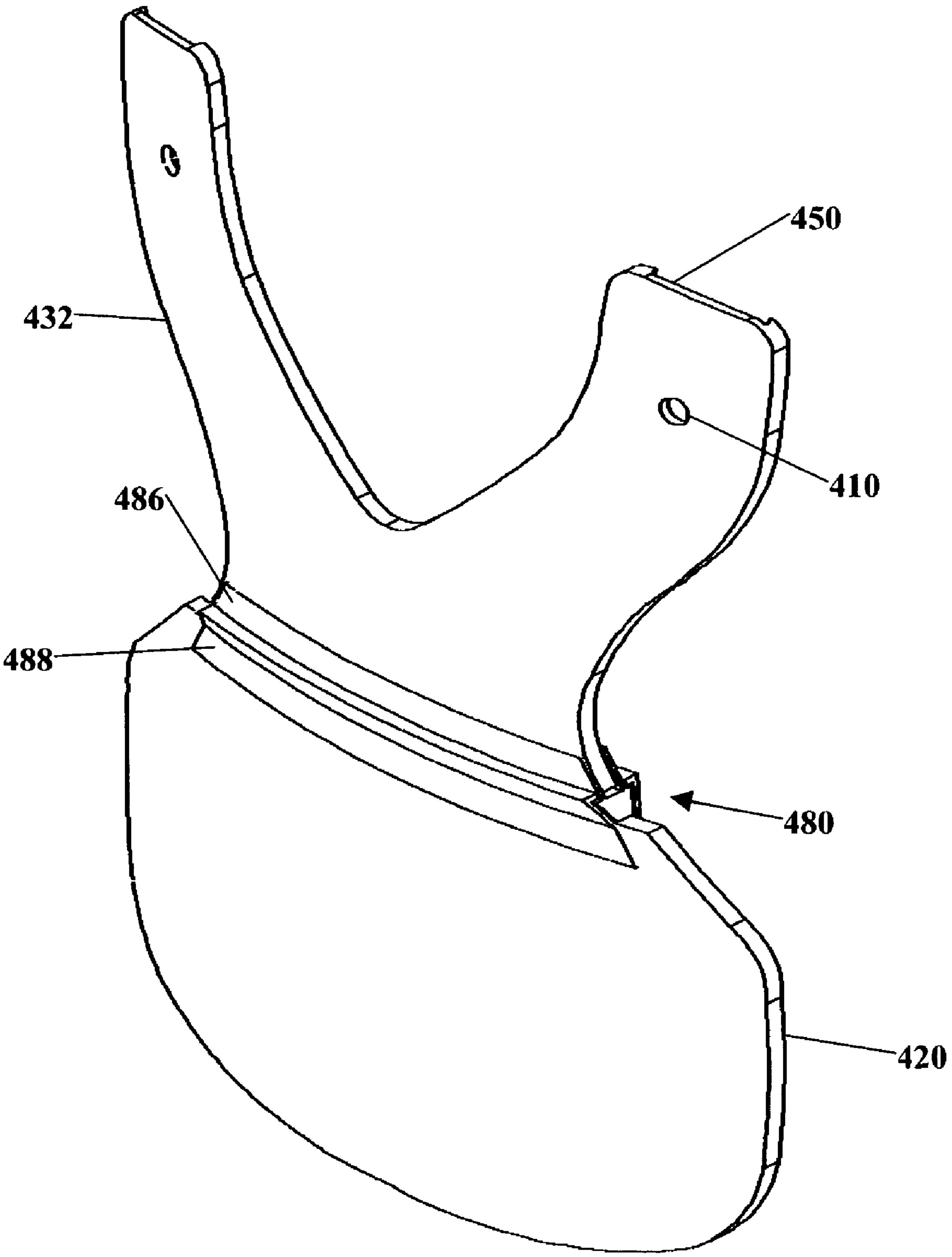
FIG. 9 is an isometric view of a vest with an elastomeric hinge mechanism.
Figure 10:
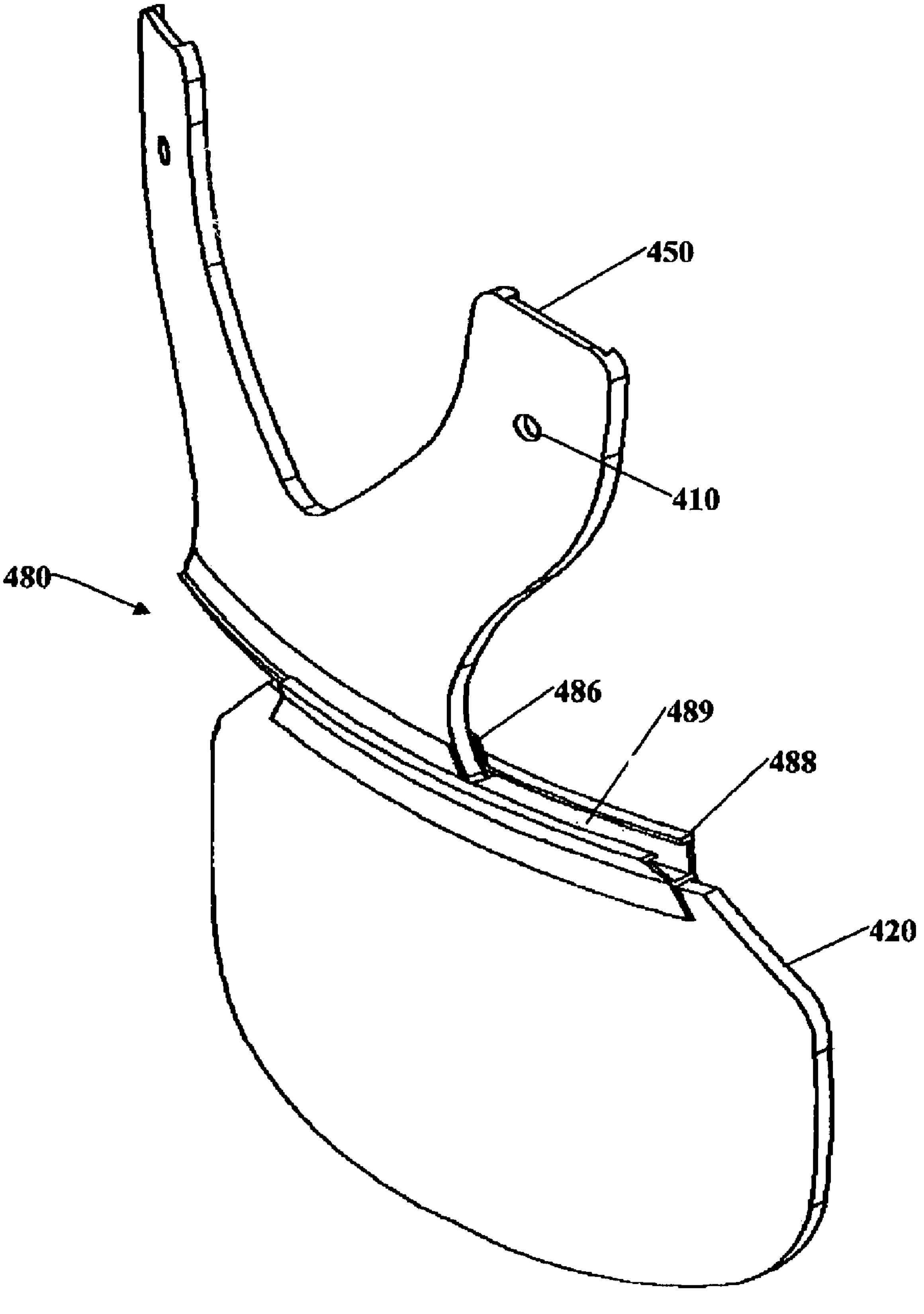
FIG. 10 is an isometric view of the vest from FIG. 9 where the two halves of the vest are being connected.

Referring to FIGS. 9 and 10, there is shown a vest type carrier that uses an elastomeric hinge mechanism. The elastomeric hinge mechanism is shown in this figure as a vest type carrier, but the carrier can be T-bar or tubular construction. In these figures, just the vest and hinge components are shown. A variety of shoulder strap and linkage configurations can be added to the chest plate. The shoulder straps can be added to carrier using the recessed areas 450, and connected to the carrier using fasteners placed through holes 410. The two vest halves are attached using an elastomeric component 480. The elastomeric joining members includes portions 486 attached to the chest plate portion 488 attached to the belly plate 484 portion. Components 486 and 488 are slid together in track 489. The two halves can be slid apart for storage or transportation as shown connected in FIG. 9, and being slide apart in FIG. 10. An optional locking mechanism may be included that can be placed into the parts once they are connected to reduce separation or lateral movement of the upper and lower portions after they are in place. The hinge in this figure can be made from a flexible elastomeric material such as rubber or other material that allows the upper and belly plate portions to flex or move independent of each other. The hinge components may also be made from a more rigid material where a gap exists between components 486 and 484 such that the upper and belly plate portions can rotate independent from each other. An additional fastener can be placed between the elastomeric components that prevent the components from sliding apart once they are in position.

Various configurations of the vest have been disclosed that show a number of different methods for construction of a instrument carrier with a clamp located in the front of the vest. The configuration of the vest has been shown as tubular, vest, and T-bar construction, but any type of vest construction may be utilized provided a front-hinged clamp mechanism is incorporated to allow the upper and lower portions to pivot for movement or folding. The shape or configuration of the vest portion of the carrier can comprise of various shapes and configurations. The figures in this application show a limited variety of these configurations but many other vest type shapes are contemplated that vary from thin straps to full chest coverage. The construction of the carrier has been shown with adjustable and or movable shoulder straps, but the shoulder straps can be integrate into the upper portion of the vest as manufactured, welded, bonded, or permanently attached.

Thus, specific embodiments and applications for single, compound, and elastomeric hinge configurations for percussion instrument carrier have been disclosed. It should be apparent, however to those skilled in the art that many more modifications besides those described are possible without departing from the inventive concepts herein. The inventive subject matter, therefore, is not to be restricted except in the spirit of the appended claims.

What is claimed is:

1. A hinged carrier for a shoulder supported harness assembly for supporting percussion instruments, comprising:

a shoulder supported carrier structure for supporting percussion instruments having at least two rigid shoulder supporting members for securing said structure on the shoulders of a user;

at least one chest component and at least one belly plate where, said chest component is connected to said shoulder supporting members;

at least some of said belly plate component that is vertically slidably secured below said chest component and rests against the user;

a pair of J-rods for securing a percussion instrument are vertically slidably secure on said belly plate component;

wherein said chest component and said belly plate are pivotably linked through an intermediary hinged joiner that creates at least three independent hinged components joined through at least two separate rotational axles that are oriented essentially horizontally parallel to said chest component;

said chest component is coupled with said belly plate component such that said rotational axle of said chest component and said belly plate are pivotably linked essentially horizontally parallel to said essentially planer chest component to allow an instrument mounted to the belly plate portion to be adjusted in an articulated relation to permit angular flexing between said belly plate relative to said chest component of said carrier while a user is wearing said shoulder supported harness;

said belly plate is vertically adjustable relative to said chest component, and said J-rods are vertically adjustable on said belly plate component.

2. The hinged carrier for a shoulder supported harness assembly for supporting percussion instruments from claim 1 further includes a back support member.

3. The hinged carrier for a shoulder supported harness assembly for supporting percussion instruments according to claim 1, wherein said shoulder support members are rigid shoulder straps and are removably and rigidly secured to at least one of the two front body components.

4. The hinged carrier for a shoulder supported harness assembly for supporting percussion instruments from claim 1 wherein the chest component comprises tubular, T-bar or vest construction or a combination thereof.

5. The hinged carrier for a shoulder supported harness assembly for supporting percussion instruments from claim 1 wherein the intermediary hinged joiner is made from a flexible non-metal material.

6. The hinged carrier for a shoulder supported harness assembly for supporting percussion instruments from claim 1 wherein the belly plate component rests against the user's belly, and or hips.

7. The hinged carrier for a shoulder supported harness assembly for supporting percussion instruments from claim 1 where the shoulder supporting members are rigid independent shoulder straps.

* * * * *